Patented May 20, 1924.

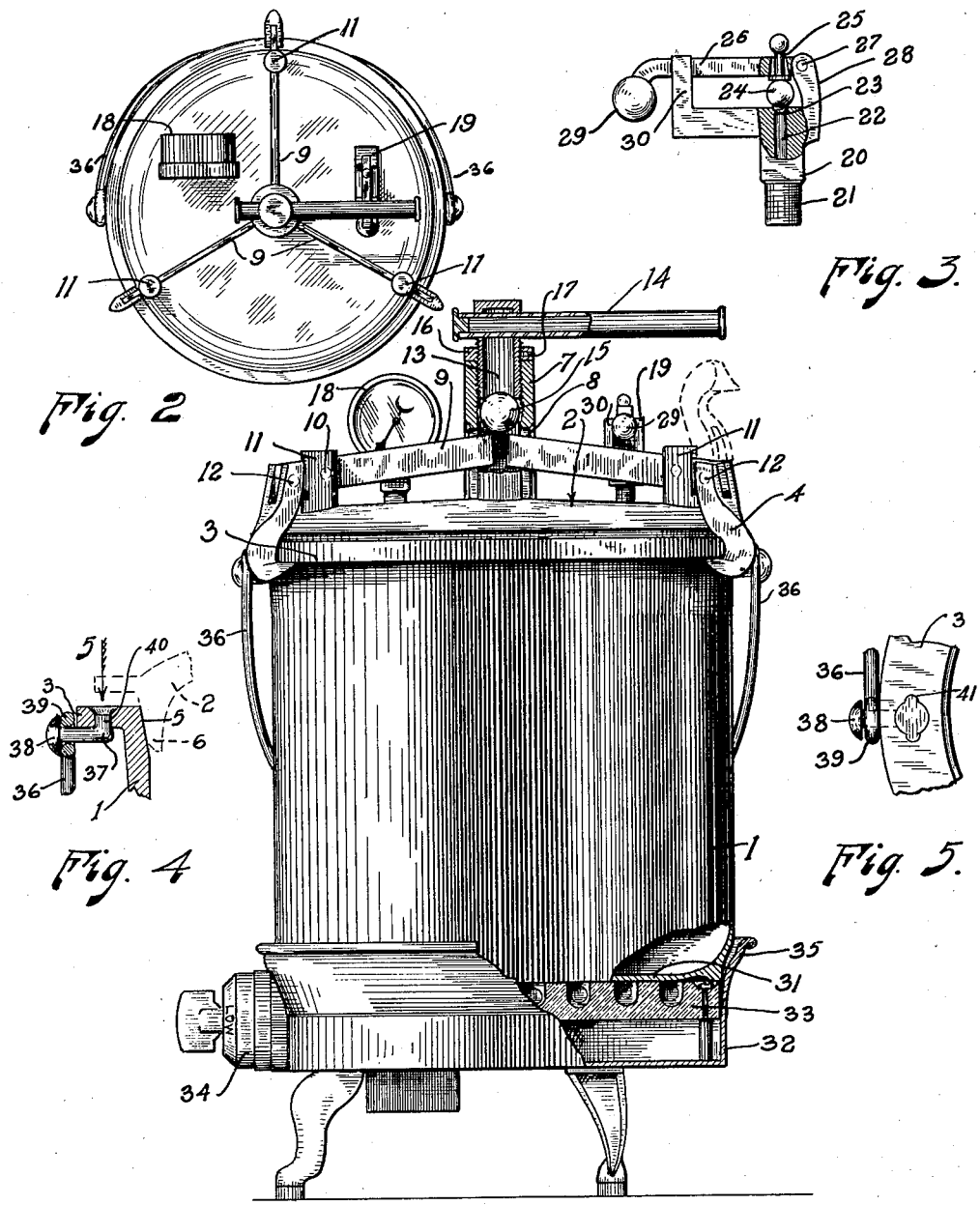

1,494,487

UNITED STATES PATENT OFFICE.

JOSEPH H. JACOBS, OF DENVER, COLORADO.

PRESSURE-COOKER LOCK.

Application filed September 22, 1922. Serial No. 589,812.

*To all whom it may concern:*

Be it known that I, JOSEPH H. JACOBS, a citizen of the United States, residing at the city and county of Denver and State of Colorado, have invented certain new and useful Improvements in Pressure-Cooker Locks; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to pressure cookers and has special reference to an improvement in the locking means.

In my co-pending application, Serial Number 489,602, filed August 3, 1921, I have shown and described a lock for securing the cover to a pressure cooker, which comprises a plurality of arms pivotally attached to the cover near the outer edge thereof and provided with hooks which engage beneath an outwardly extending flange on the pot. A central stem on the cover has vertical slots for receiving the ends of the levers and is provided with a screw-threaded member that is adapted to force the ends of the levers downwardly and thereby clamp the cover against the pot.

My present invention relates to an improved construction of the locking means by means of which the same may be adjusted so that the cover will always be held in place with the same degree of force. My improved cooker is also adapted to be used in connection with an electric heating element and is provided with a safety valve of improved construction.

In order to more clearly describe my invention, I shall have reference to the accompanying drawing, in which—

Fig. 1 shows a side elevation of my improved cooker mounted on an electric heater, parts being broken away to better show the construction;

Fig. 2 is a plan view of the top of the cooker;

Fig. 3 is a side elevation of the safety valve with parts broken away to show the construction;

Fig. 4 is a section through the flange at the top of the cooker pot and shows the manner in which the handle or bail is pivotally secured thereto; and Fig. 5 is a top plan view of the portion shown in Fig. 4, looking in the direction of the arrow 5.

The same reference numerals will be employed to designate the same parts throughout the several views.

Numeral 1 represents the pot portion of my pressure cooker and 2 the cover portion thereof. Surrounding the upper end of the pot 1 is an outwardly extending flange 3 which co-operates with the hooks 4, in the manner to be hereinafter described. The inner surface of the pot near the upper end thereof is tapered, as indicated by numeral 5 in Fig. 4, and co-operates with a correspondingly tapered flange 6 of the cover 2 so as to form a tight joint. Secured to the upper surface of the cover and centrally thereof, is a tubular member 7, which is preferably cast integral with the cover. The tubular member 7 has three slots 8 near its lower end for the reception of the ends of the levers 9, which are pivotally mounted at 10 in the vertical lugs 11 and have attached to their outer ends by means of pintles 12 the hooks 4, all as clearly shown in Fig. 1. The upper end of member 7 is threaded and has co-operatively secured thereto a threaded tubular plug 13, which is provided near its upper end with a transverse opening for the reception of the bakelite handle 14, by means of which the plug 13 is rotated. A ball 15 rests loosely on the ends of levers 9 and is engaged by the lower end of the plug 13. It is evident that when the plug 13 is rotated in such a direction that its end moves downwardly, it will force the ball 15 and the ends of the levers 9 down, and this will cause the hooks 4 to exert an upward pressure against the lower side of flange 3, which in turn will result in a downward pressure on pivots 10, which pressure tends to close the cover and hold it firmly in place. In order to cause the cover to be held against the pot with the same amount of pressure at all times, I provide the plug 13 with an adjustable collar 16, which can be clamped in adjusted position by means of a set screw 17. The purpose of the adjustable collar will be more fully described hereinafter. The cooker is provided with a pressure gauge 18 and a safety valve 19. The safety valve is adjusted to open at a pressure of about twenty pounds per square inch and when in operative condition will insure against excessive pressure and explosions. If the safety valve becomes inoperative for any reason, the pressure will soon become excessive and may cause the cooker to explode. To guard against this, I carefully adjust the collar 16 on the plug 7 in such a manner that the pressure is sufficient to hold the cover tight for steam pressures of less than twenty-two pounds per square inch, but which will permit the cover to move slightly if the steam pressure exceeds this. The steam pressure will therefore be relieved by leakage between the beveled side 5 and the flange 6 whenever the pressure exceeds that for which the safety valve is adjusted by two pounds or more per square inch.

The yielding arrangement for locking the cover in place permits the latter to function as a safety valve, which supplements the regular safety valve 19 and insures against explosions. The yielding nature of the means employed by me for holding the cover in place is an important safeguard which cannot be present in pressure cookers whose covers are secured in place by six or more screws, in the manner common. The collar 16, it will be readily seen, is an important element in the combination by means of which the auxiliary safety valve action is secured, as by means of it the cover can be adjusted for a given pressure and will always permit steam to escape when this pressure is exceeded, which would obviously not be the case if the plug 7 were tightened differently at different times.

The safety valve is shown in side elevation in Fig. 3 and consists of a tubular portion 20 having a threaded end 21 for insertion into a threaded hole in the cover. The upper end of the opening 22 is chamfered slightly and serves as a seat for the spherical end 23 of the valve member 24, to the upper side of which is secured a stem 25 which passes through a hole in the arm 26, which is pivoted at 27 to the vertical portion 28 and is provided near its outer end with a weight 29, which rests loosely between the upright arm 30.

The bottom 31 of the pot is substantially flat and can be set over a gas flame, on the surface of a coal stove, or on an electric heater. I have shown an electric heater consisting of a metal pan-like member 32, within which is mounted an ordinary electric heating element 33, which is connected to a circuit changing switch 34. The sides 35 are designed to fit closely the co-operating sides of the pot so as to conserve the heat. Attention is called to the fact that the flat bottom surface of the pot co-operates with the flat heating element 33 so as to secure a very efficient transfer of heat.

My pot 1 is provided with a bail 36, which is secured in the following manner. A hole is drilled through the flange 3 and the upper end thereof is counterbored. A pin 37 having a head 38 is passed through the rings 39 in the end of the bail. The pin 37 has its inner end 40 bent at a right angle to the main body portion thereof, and this bent portion is inserted into the hole in the flange. It is then riveted or soldered in place. To prevent the pin 37 from turning in the hole, the latter is provided at its upper end with notches 41.

Having now described my invention, what I claim is:

1. A pressure cooker comprising a pot having an open end, a cover adapted to be secured to said open end so as to form a closed chamber, an outwardly extending flange on said pot near the open end thereof, a plurality of lugs spaced at substantially equal distances around the upper edge of the cover, a central tubular member on said cover, said member having a plurality of radial slots near its bottom, levers pivoted to said lugs and having their inner ends extending through said slots, hooks pivoted to the outer ends of said levers and adapted to engage said flange, a plug having a threaded connection with said tubular member and adapted to exert a downward pressure on the inner ends of the levers, and means adjustably secured to the plug and co-operating with the tubular member to limit its downward movement.

2. A pressure cooker comprising a pot having an open end, a cover adapted to be secured to said open end so as to form a closed chamber, an outwardly extending flange on said pot near the open end thereof, a plurality of lugs spaced at substantially equal distances around the upper edge of the cover, a central tubular member on said cover, said member having a plurality of radial slots near its bottom, levers pivoted to said lugs and having their inner ends extending through said slots, hooks pivoted to the outer ends of said levers and adapted to engage said flange, a plug having a threaded connection with said tubular member and adapted to exert a downward pressure on the inner ends of the levers, and a nut adjustably secured to the plug and adapted to co-operate with the tubular member to limit its downward movement.

3. A pressure cooker comprising a pot having an open end, a cover adapted to be secured to said open end so as to form a closed chamber, an outwardly extending flange on said pot near the open end thereof, a plurality of lugs spaced at substantially equal distances around the upper edge of the cover, a central tubular member on said cover, said member having a plurality of radial slots near its bottom, levers pivoted to said lugs and having their inner ends extending through said slots, hooks pivoted to the outer ends of said levers and adapted to engage said flange, a plug having a threaded connection with said tubular member, a spherical member between the end of the plug and the ends of the levers, and means adjustably secured to the plug and co-operating with the tubular member to limit its downward movement.

4. A pressure cooker comprising a pot having an open end, a cover adapted to be secured to said open end so as to form a closed chamber, an outwardly extending flange on said pot near the open end thereof, a plurality of lugs spaced at substantially equal distances around the upper edge of the cover, a central tubular member on said cover, said member having a plurality of radial slots near its bottom, levers pivoted to said lugs and having their inner ends extending through said slots, hooks pivoted to the outer ends of said levers and adapted to engage said flange, a plug having a threaded connection with said tubular member, a spherical member between the end of the plug and the ends of the levers, a nut adjustably secured to the plug and adapted to co-operate with the tubular member to limit its downward movement, and means on the nut for clamping it in place on the plug.

In testimony whereof I affix my signature.

JOSEPH H. JACOBS.